(12) United States Patent
Kong et al.

(10) Patent No.: US 12,555,876 B2
(45) Date of Patent: Feb. 17, 2026

(54) CURRENT BLOCKING STRUCTURE APPLIED TO POUCH TYPE SECONDARY BATTERY

(71) Applicant: LG ENERGY SOLUTION, LTD., Seoul (KR)

(72) Inventors: Jin Hak Kong, Seoul (KR); Yong Seok Choi, Daejeon (KR); Dong Yeon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 6 days.

(21) Appl. No.: 18/628,396

(22) Filed: Apr. 5, 2024

(65) Prior Publication Data

US 2024/0283113 A1 Aug. 22, 2024

Related U.S. Application Data

(63) Continuation of application No. 16/467,903, filed as application No. PCT/KR2018/000308 on Jan. 5, 2018, now Pat. No. 11,978,926.

(30) Foreign Application Priority Data

Jun. 21, 2017 (KR) .......................... 10-2017-0078347

(51) Int. Cl.
*H01M 50/105* (2021.01)
*H01M 50/536* (2021.01)
(Continued)

(52) U.S. Cl.
CPC ....... *H01M 50/578* (2021.01); *H01M 50/105* (2021.01); *H01M 50/553* (2021.01);
(Continued)

(58) Field of Classification Search
CPC .. H01M 2/0207; H01M 2/021; H01M 2/0212; H01M 2/26; H01M 2/266;
(Continued)

(56) References Cited

U.S. PATENT DOCUMENTS 6,713,209 B1 3/2004 Naskali
11,978,926 B2 * 5/2024 Kong .................. H01M 50/557
(Continued)

FOREIGN PATENT DOCUMENTS

CN 101411005 A 4/2009
EP 2 429 018 A1 3/2012
(Continued)

OTHER PUBLICATIONS

"KR20130050654A Secondary Battery for Preventing Disconnection Between Lead and Tab"; Machine translation of KR 20130050654 A obtained from ESpacenet Patent Translate (Year: 2011).*
(Continued)

Primary Examiner — Allison Bourke
Assistant Examiner — Charlene Bermudez
(74) Attorney, Agent, or Firm — Birch, Stewart, Kolasch & Birch, LLP

(57) ABSTRACT

Discussed is a pouch type secondary battery including an electrode assembly in which one or more positive electrode plates and negative electrode plates are stacked, an electrode tap that extends from the electrode assembly, an electrode lead bondingly connected to the electrode tap, and a pouch exterior that surrounds and seals the electrode assembly such that a portion of the electrode lead is exposed. The electrode lead includes a first weld area electrically coupled to the electrode tap. The electrode tap includes a second weld area electrically coupled to the first weld area, an electrode connection part distinguished from the second weld area by a rupture portion connecting area, and electrically connected
(Continued)

to the electrode assembly. The rupture portion connecting area connects the second weld area and the electrode connection part, and is ruptured when stress occurs and separates the second weld area from the electrode connection part.

12 Claims, 3 Drawing Sheets

(51) Int. Cl.
    *H01M 50/553* (2021.01)
    *H01M 50/557* (2021.01)
    *H01M 50/578* (2021.01)
    *H01M 50/574* (2021.01)

(52) U.S. Cl.
    CPC ........ *H01M 50/536* (2021.01); *H01M 50/574* (2021.01); *H01M 2200/20* (2013.01); *H01M 2220/30* (2013.01)

(58) Field of Classification Search
    CPC ........ H01M 2/34; H01M 2/345; H01M 2/348; H01M 4/02; H01M 10/00; H01M 10/04; H01M 10/128; H01M 10/14; H01M 10/16; H01M 50/533; H01M 50/569; H01M 50/574; H01M 50/578; H01M 50/579; H01M 50/581; H01M 50/583; B81B 2203/0109; B81B 2203/0118; B81B 2203/0323; B81B 7/0045; B82Y 30/00; B82Y 40/00; H01H 11/041; H01H 11/042; H01H 15/06; H01H 15/08; H01H 37/54; H01H 39/006; H01H 2039/008; H01G 4/005; B01J 2219/2485

See application file for complete search history.

(56) References Cited

U.S. PATENT DOCUMENTS

| | | |
|---|---|---|
| 2011/0104520 A1 | 5/2011 | Ahn |
| 2012/0040235 A1 | 2/2012 | Cho et al. |
| 2015/0064519 A1 | 3/2015 | Hong |
| 2015/0072179 A1 | 3/2015 | Itabashi |
| 2016/0028068 A1 | 1/2016 | Yang et al. |
| 2016/0315355 A1 | 10/2016 | Hallac et al. |
| 2017/0125786 A1 | 5/2017 | Park et al. |
| 2018/0062148 A1* | 3/2018 | Cho .................... H01M 50/184 |
| 2018/0102521 A1 | 4/2018 | Cho et al. |

FOREIGN PATENT DOCUMENTS

| | | | | |
|---|---|---|---|---|
| JP | 2004-119383 A | 4/2004 | | |
| JP | 2008-153204 A | 7/2008 | | |
| JP | 2011-96664 A | 5/2011 | | |
| JP | 2013-505553 A | 2/2013 | | |
| JP | 2013-191352 A | 9/2013 | | |
| JP | 2013-191366 A | 9/2013 | | |
| JP | 2017-76601 A | 4/2017 | | |
| KR | 10-2011-0048470 A | 5/2011 | | |
| KR | 10-2013-0050654 A | 5/2013 | | |
| KR | 20130050654 A | * | 5/2013 | .......... H01M 50/543 |
| KR | 10-2013-0058345 A | 6/2013 | | |
| KR | 10-2013-0134238 A | 12/2013 | | |
| KR | 10-2014-0084560 A | 7/2014 | | |
| KR | 10-1417280 B1 | 7/2014 | | |
| KR | 10-2014-0114429 A | 9/2014 | | |
| KR | 10-2015-0025974 A | 3/2015 | | |
| KR | 10-1500101 B1 | 3/2015 | | |
| KR | 10-2015-0051518 A | 5/2015 | | |
| KR | 10-2015-0083497 A | 7/2015 | | |
| KR | 10-2016-0131416 A | 11/2016 | | |
| KR | 10-2016-0131657 A | 11/2016 | | |
| KR | 10-1846050 B1 | 4/2018 | | |
| WO | WO 2016/039503 A1 | 3/2016 | | |
| WO | WO 2016/178539 A1 | 11/2016 | | |

OTHER PUBLICATIONS

Duan et al; "A note on stress intensity factors for a crack emanating from a sharp V-notch"; Engineering Fracture Mechanics Journal (Year: 2012).*
Duan, Jingbo, "A note on stress intensity factors for a crack emanating from a sharp V-notch", Engineering Fracture Mechanics Journal, Apr. 15, 2012, 9 pages.
European Search Report for Appl. No. 18819988.9 dated Feb. 27, 2020.
International Search Report for PCT/KR2018/000308 (PCT/ISA/210) mailed on Apr. 16, 2018, with English translation.

* cited by examiner

CURRENT BLOCKING STRUCTURE APPLIED TO POUCH TYPE SECONDARY BATTERY

CROSS-REFERENCE TO RELATED APPLICATIONS

This Application is a Continuation of U.S. patent application Ser. No. 16/467,903, filed on Jun. 7, 2019 (now U.S. Pat. No. 11,978,926, issued on May 7, 2024), which was filed as the National Phase of PCT International Application No. PCT/KR2018/000308, filed on Jan. 5, 2018, which claims the priority under 35 U.S.C. § 119(a) to Korean Patent Application No. 10-2017-0078347, filed in the Republic of Korea on Jun. 21, 2017, the entire contents of which are hereby expressly incorporated by reference into the present application.

BACKGROUND

Field

The present invention relates to a current interrupt structure applied to a pouch type secondary battery and, more particularly, to a structure which, as a portion of an electrode tap, is designed to be ruptured due to stress resulting from a swelling phenomenon and to thus enable the current interruption.

Discussion of the Related Art

In the modern society, as technologies for various IT devices including mobile devices have been developed and the their demands have increased, the technical development and demands of secondary batteries that serve as energy source for the IT devices also tend to increase.

The secondaries battery may be classified into cylindrical, prismatic, and pouch type secondary batteries depending on the shapes of a battery case, wherein the pouch type secondary batteries are suitable to be applied to various IT devices such as mobile devices that tend to be miniaturized recently, because of their advantages about easy of shape modification, inexpensive manufacturing costs, and light weight.

The pouch type secondary batteries are constituted by including an electrode assembly, an electrode tap extending from the electrode assembly, an electrode lead electrically connected to the electrode tap by welding, and a pouch exterior for accommodating the electrode assembly. In these pouch type secondary batteries, internal temperature of the batteries rises due to the internal short circuit or an overcharged state that exceeds allowable current/voltage, and in this case, the pressure inside the batteries becomes increased due to the electrolyte vaporization caused by the internal temperature rise of the batteries. As the pressure inside the batteries increases, the swelling phenomenon occurs, and if the swelling phenomenon continues, risk issues such as ignition or explosion of the batteries may be caused.

To solve the above-described issues, the specific regions inside the battery structures are designed to perform the current interruption function so that, when the swelling phenomenon occurs, the current flow of the batteries is interrupted at an appropriate time so as to be able to prevent the occurrence of ignition or explosion of the battery.

SUMMARY OF THE INVENTION

The present invention requires a structure which is applicable to a pouch type secondary battery in which current flow inside a battery may be interrupted as a swelling phenomenon occurs.

A pouch type secondary battery according to the present invention includes: an electrode assembly (100) in which one or more positive electrode plates and negative electrode plates are stacked; an electrode tap (110) that extends from the electrode assembly; an electrode lead (200) bondingly connected to the electrode tap; and a pouch exterior (300) that surrounds and seals the electrode assembly such that a portion of the electrode lead is exposed, wherein the electrode lead (200) is provided with a first weld area (F1) electrically coupled to the electrode tap (110), and the electrode tap (110) includes: a second weld area (F2) electrically coupled to the first weld area (F1); an electrode connection part (112) distinguished from the second weld area (F1) by a rupture portion connecting area (120), and electrically connected to the electrode assembly (100); and the rupture portion connecting area (120) which connects the second weld area (F2) and the electrode connection part (112), and which is configured to rupture and separate the second weld area (F2) from the electrode connection part (112) when a predetermined amount of stress occurs.

In addition, the rupture portion connecting area (120) includes rupture lines (124), each rupture line has a linear shaped groove that is provided on a surface of the electrode tap (110) in a longitudinal direction and is configured to be bent and ruptured in a direction perpendicular to the surface when the predetermined amount of stress occurs.

In addition, a rupture groove (122) is provided at each of both ends of the rupture line in a direction parallel to the surface of the electrode tap (110).

The rupture groove (122) is in a shape of a triangular (V) groove having a first oblique surface (a) and a second oblique surface (b), wherein the first and second oblique surfaces define a predetermined first internal angle (A).

The rupture line (124) extends in a shape of a triangular groove having a third oblique surface (c) and a fourth oblique surface (d), wherein the third and fourth oblique surfaces which define a predetermined second internal angle (B) and have a height (h) that is a length in a direction perpendicular to the surface of the electrode tap (110).

Also, the rupture lines (124) are provided, while facing each other in a width direction of the rupture groove (122), on upper and lower surfaces of the rupture portion connecting area (120).

In addition, the predetermined first internal angle (A) has a size of at least 150 degrees or less.

Also, the predetermined second internal angle (B) has a size of at least 90 degrees or less.

In the present invention, a triangular shaped groove is designed as a double structure at a portion that connects an area in which an electrode tap is electrically connected to the electrode lead and an area in which the electrode tap is electrically connected to an electrode assembly, and stress is concentrated when a swelling phenomenon occurs, resulting in accurate and smooth rupture, and thus various risk issues caused by the continuous swelling phenomenon may be prevented.

DETAILED DESCRIPTIONS OF THE EMBODIMENTS

Figure 1:
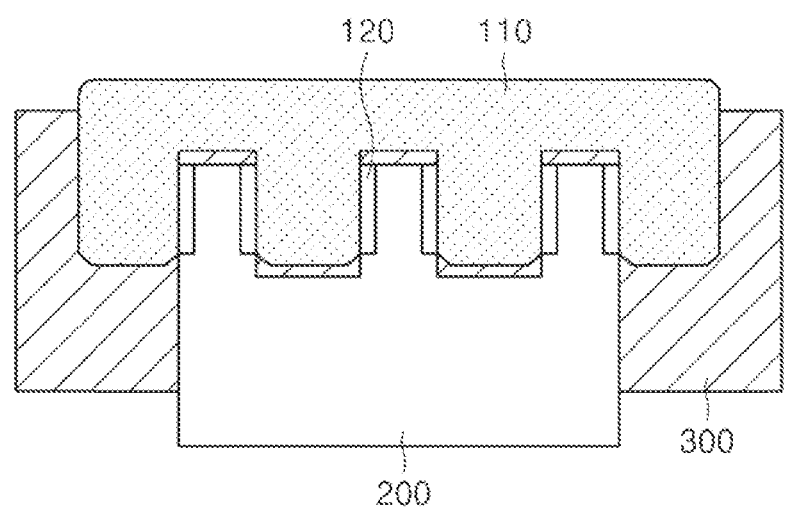
FIG. 1 is a top view illustrating an internal structure of a pouch type secondary battery.

Hereinafter, embodiments of the present invention will be described in detail with reference to the accompanying drawings so as to be easily carried out by a person with ordinary skill in the art to which the invention pertains. The present invention may, however, be embodied in different forms and should not be construed as limited to the embodiments set forth herein. Also, in the drawings, anything unrelated to the description will be omitted so as to clearly describe the present invention, and like reference numerals in the drawings denote like elements throughout the specification.

Although the ordinal numbers such as first and second are used herein to describe various elements, these elements should not be limited by these numbers. The terms are only used to distinguish one element from other elements. For example, a first element can be referred to as a second element, and similarly a second element can be referred to as a first element without departing from the scope of a right of the present invention. The terms are used only for explaining a specific embodiment while not intend to limit the present invention. The expression of a singular form may include plural forms unless definitely indicating a particular case in terms of the context.

Throughout the specification, when one part is referred to as being "connected" to another part, it can be "directly connected" to another portion, and "electrically connected" to another portion with intervening devices. Furthermore, when it is described that one part "includes" some elements, it is not meant as the exclusion of the other components but to imply the further inclusion of the other components, unless explicitly stated to the contrary. Throughout the specification, the terms "step" or "step of" does not mean "step for".

The terms used in the present invention are selected as general terms currently and widely used in the art in consideration of functions of the present invention, but the terms may vary according to the intention of those of ordinary skill in the art, precedents, or new technology in the art. Also, specified terms may be temporarily selected by the applicant, and in this case, the detailed meaning thereof will be described in the detailed description of the invention. Thus, the terms used in the present invention should be defined not as simple names but based on the meaning of the terms and the overall description of the invention.

Hereinafter, embodiments of the present invention will be described in detail with reference to the accompanying drawings.

FIG. 1 is a top view illustrating a connection structure inside a pouch type secondary battery according to the present invention.

Referring to FIG. 1, the pouch type secondary battery may be configured to mainly include an electrode assembly 100, an electrode tap 110, an electrode lead 200, a pouch exterior 300, and a rupture portion connecting area 120 that is a partial area of the electrode tap 110.

The electrode assembly 100 is constituted in a manner in which one or more positive electrode plates, separators, and negative electrode plates are stacked. Here, the positive electrode plates and the negative electrode plates are manufactured in such a manner in which an electrode active material is applied to a thin plate-shaped metal collecting plate such as aluminum and copper, and then dried.

The electrode tap 110 is connected to the positive electrode plate and the negative electrode plate, with a structure extending from the electrode assembly or a separate conductive member connected by welding or the like. Here, although not illustrated in FIG. 1 in detail, the electrode tap 110 is electrically coupled to the electrode lead 200 through an area welded with the electrode lead 200.

The rupture portion connecting area 120 is an area designed to separate an area in which the electrode tap 110 is electrically coupled/connected to the electrode lead 200, from an area that is the remaining area of the electrode tap 110 and is electrically connected to the electrode assembly 100, by the force generated from the deformation of a pouch and a cell resulted from the swelling phenomenon caused by a overcharged state or a short circuit of the battery, and thus this area may perform a function of interrupting the current inside the battery.

In FIG. 1, although the rupture portion connecting area 120 is represented as a separate portion so that the rupture portion connecting area 120 is visually distinguished, the rupture portion connecting area 120 is not a separate device or a configuration but the area included in the electrode tap 110 designed to separate the area in which the electrode tap 110 is electrically coupled/connected to the electrode lead 200, from the area that is the remaining area of the electrode tap 110 and is electrically connected to the electrode assembly 100.

The rupture portion connecting area 120 may include: a rupture line 124 having a linear shaped groove that is provided on a surface of the electrode tap 110 in a longitudinal direction and is bent and ruptured in a direction perpendicular to the surface when stress caused by the swelling phenomenon occurs; and a rupture groove having a direction parallel to the surface of the electrode tap 110 and provided at each of both ends of the rupture line 124. This will be described in detail with reference to the accompanying drawings.

For reference, FIG. 1 illustrates only a state in which a lower side part of the pouch exterior 300 is connected to the electrode lead 200, but actually, the pouch exterior 300 is also bondingly connected to a top surface of the electrode tap 110. This will be described later with reference to FIG. 2.

Figure 2:
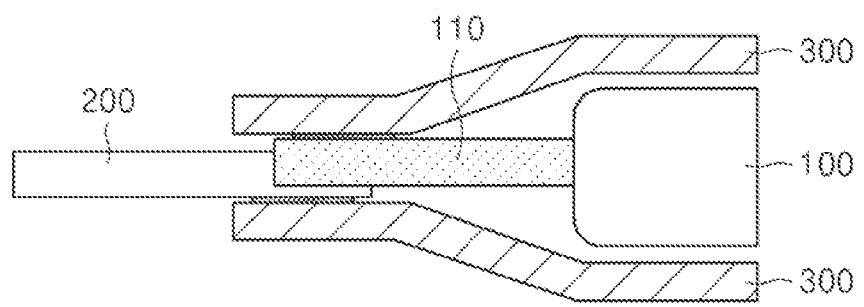
FIG. 2 is a cross-sectional view of FIG. 1.

FIG. 2 is a view illustrating a state in which an internal structure of the pouch type secondary battery as in FIG. 1 is viewed from the side.

Referring to FIG. 2, the electrode tap 110 is bondingly connected to the upper side part of the pouch exterior 300, and the electrode lead 200 is bondingly connected to the lower side part of the pouch exterior 300. Also, as described above, the electrode tap 110 and the electrode lead 200 are bondingly connected by welding respective weld areas provided therein, and in this state, the electrode tap 110 and the electrode lead 200 may be electrically coupled through the weld areas. This will be described in more detail with reference to FIG. 3. In this state of FIG. 2, internal temperature of the battery rises when there is an abnormal condition such as an internal short circuit or an overcharged state that exceeds allowable current or voltage of the pouch type secondary battery, i.e., reference current/voltage. As the temperature inside the battery rises, the pressure inside the battery becomes increased due to the electrolyte vaporization or the like, resulting in the swelling phenomenon in which the battery cell swells.

When the swelling phenomenon occurs, the pouch exterior 300 is deformed as the battery cell swells.

That is, the upper side part of the pouch exterior 300 is subjected to the upward force, and the lower side part of the pouch exterior 300 is subjected to the downward force, resulting in a distortion phenomenon in which the upper side part of the pouch exterior 300 and the lower side part of the pouch exterior 300 are subjected to the opposite forces different from each other. Accordingly, the electrode tap 110 bondingly connected to the upper side part of the pouch exterior 300 and the electrode lead 200 bondingly connected to the lower side part are also subjected to the upward and downward forces, respectively, which are opposite to each other.

Therefore, the rupture groove 122 and the rupture line 124 are provided in the rupture portion connecting area 120 that is an area connecting: areas F1 and F2 in which the electrode tap 110 is bonded to the electrode lead 200 by welding; and an area 112 electrically connected to the electrode assembly 100 corresponding to the remaining area thereof, and thus the stress caused by the distortion phenomenon is concentrated, and accordingly, the rupture line 124 is ruptured such that the areas F1 and F2 in which the electrode tap 110 is bonded to the electrode lead 200 by welding is separated from the area 112 electrically connected to the electrode assembly 100 corresponding to the remaining area thereof. As separated as described above, the current flow between the electrode lead 200 and the electrode assembly 100 may be interrupted.

Figure 3:
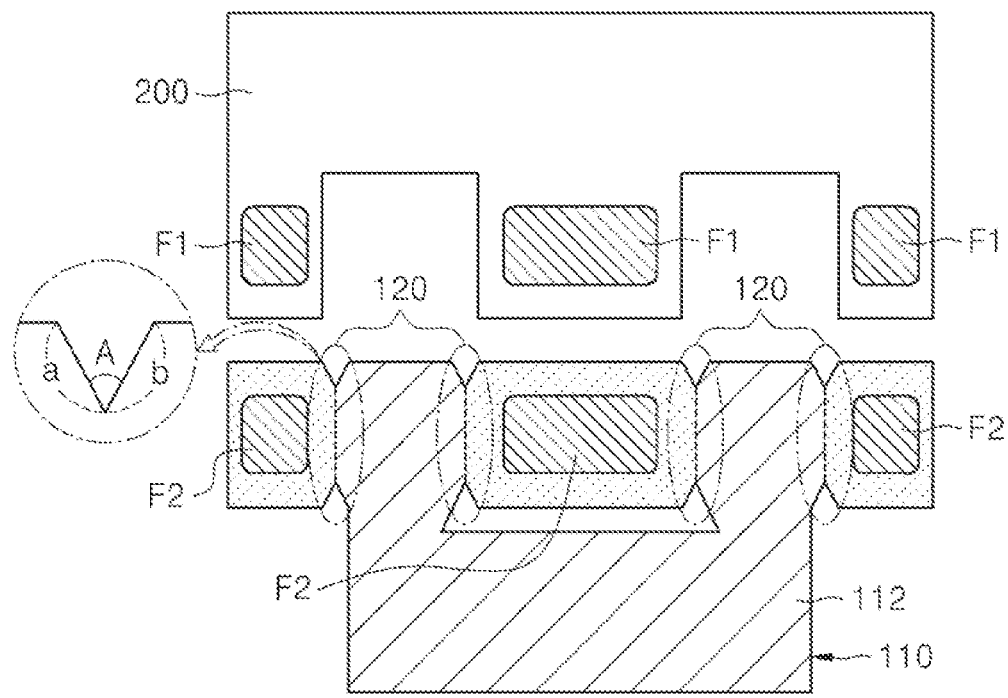
FIG. 3 is plan views of an electrode tap and an electrode lead according to an embodiment of the present invention.

Hereinafter, as illustrated in FIG. 3, distinguished from the area in which the electrode tap 110 is welded to and electrically coupled to the electrode lead 200, the area in which the electrode tap 110 is electrically connected to the electrode assembly 100 is denoted as an electrode connection part 112, and then the description will be continued.

FIG. 3 is a plan view illustrating a state before the electrode tap 110 is coupled to the electrode lead 200, and a structure of the rupture portion connecting area 120 will be described in detail with reference thereto.

First, the electrode lead 200 may be provided with a first weld area F1 that is welded to and electrically coupled to the electrode tap 110.

As illustrated in FIG. 3, the electrode tap 110 is provided with a second weld area F2 that is welded to and electrically coupled to the respective first weld area F1 provided in the electrode lead 200, and also includes an electrode connection part 112 that is distinguished from the second weld area F2 and electrically connected to the electrode assembly 100, and a rupture portion connecting area 120 which connects the second weld area F2 and the electrode connection part 112, and which is ruptured when stress caused by the swelling phenomenon occurs and separates the second weld area F2 from the electrode connection part 112. Referring to FIG. 3, the rupture portion connecting area 120, in which the second weld area F2 of the electrode tap 110 is connected to or separated from the electrode connection part 112, is illustrated as four areas.

Therefore, when the stress caused by the swelling phenomenon occurs, the four rupture portion connecting areas 120, which are designed with the rupture structures according to an embodiment of the present invention, are ruptured, resulting in the separation of the electrode connection part 112 from the respective second weld area F2 provided in the electrode tap 110, which is welded to and electrically coupled to the respective first weld area F1 provided in the electrode lead 200.

Figure 4:
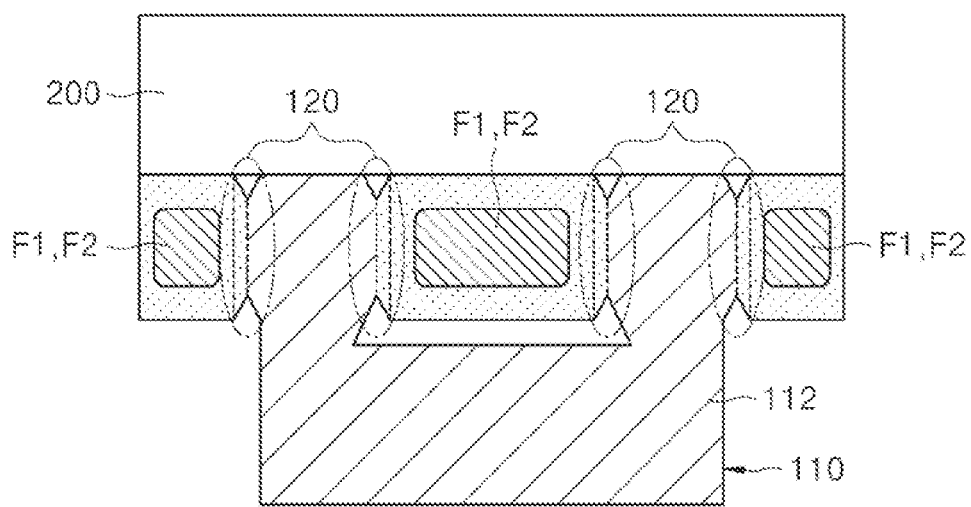
FIG. 4 is a plan view illustrating a state in which the electrode tap is coupled to the electrode lead of FIG. 3.

As illustrated in FIG. 4, the electrode tap 110 and the electrode lead 200 are electrically coupled/connected to each other by welding the areas denoted as F1 and F2, that is, by welding the respective first weld area F1 provided in the electrode lead 200 to the second weld area F2 provided in the electrode tap 110, and through the second weld areas F2 of the electrode tap 110 electrically coupled/connected to the first weld areas F1, the electrode connection part 112 electrically connected to the electrode assembly 100 may be electrically connected to the electrode lead 200.

That is, as illustrated in the drawing, it may be described that, in the electrode tap 110, the rupture portion connecting area 120, which is the area in which the electrode connection part 112 is connected to the second weld areas F2 that are electrically coupled to the first weld areas F1, becomes a current flow path between the electrode lead 200 and the electrode assembly 100.

Referring to the enlarged views illustrated in FIGS. 3 and 5, a structure of the rupture portion connecting area 120 will be described in detail.

First, an overall structure of the rupture portion connecting area 120 may have a structure including: a line-shaped rupture line 124 provided on a surface of the electrode tap 100 in a longitudinal direction; and rupture grooves 122 provided at both ends of the rupture line 122 in a direction parallel to the surface of the electrode tap 110.

Referring to the cross-sectional view of the rupture grooves 122 illustrated in FIG. 3, each of the rupture grooves 122 may be in a shape of a triangular (V) groove having a first oblique side (a) and a second oblique side (b) which define a predetermined first internal angle (A). As described above, they are provided at both ends of the rupture line 124 defined on the surface of the electrode tap 110 in the longitudinal direction, and are provided at upper and lower ends of the rupture line 124, respectively, while having a shape in which triangular (V) grooves face each other.

Figure 5:
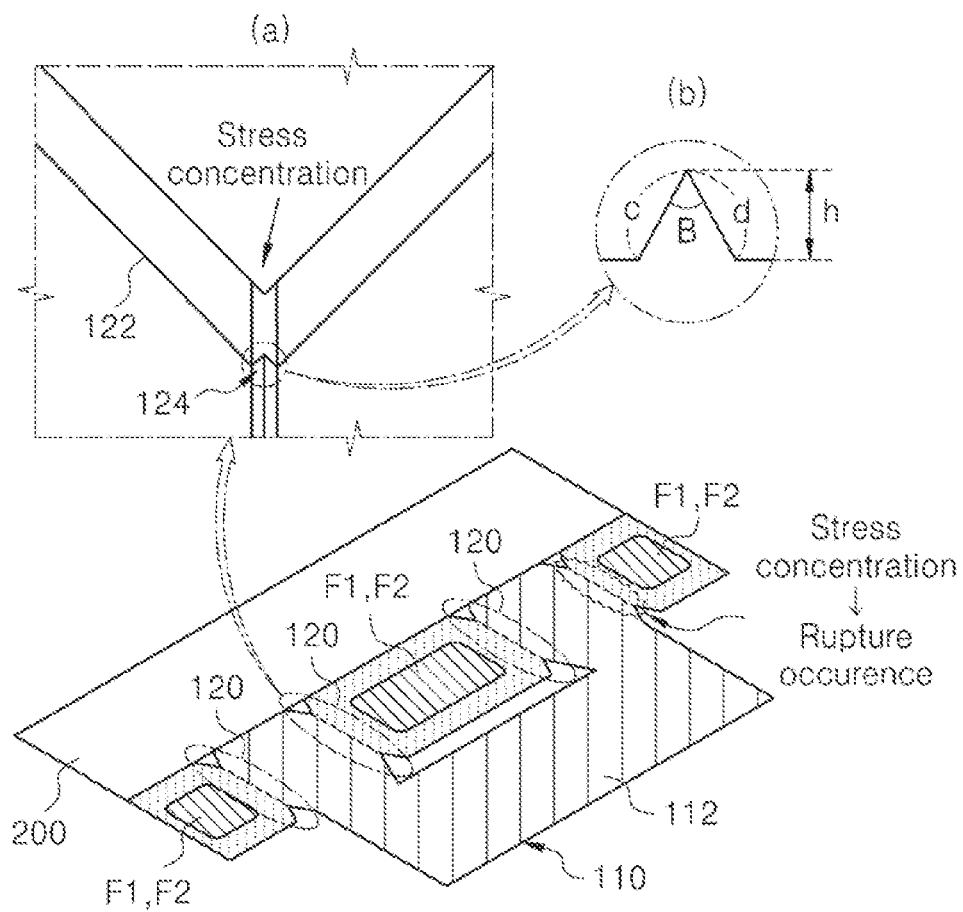
FIG. 5 is a plan view representing a rupture operation principal and an enlarged view of a rupture structure in a state of FIG. 4.

Explaining with reference to (a) of FIG. 5, which is a three-dimensionally enlarged view of portions of the rupture groove 122 and the rupture line 124 so as to describe the more detailed structure of the rupture groove 122 and the rupture line 124, the rupture line 124 has a linear shaped groove that is provided on the surface of the electrode tap 110 in the longitudinal direction so as to be bent and ruptured in the direction perpendicular to the surface when the stress caused by the distortion phenomenon occurs. Explaining with reference to the cross-section of the rupture line 124 in (b) when (a) illustrated in FIG. 5 is viewed from above, the rupture line 124 may extend in a shape of a triangular groove having a third oblique side (c) and a fourth oblique side (d) which define a predetermined second internal angle (B) and having a height (h) that is a length in a direction perpendicular to the surface of the electrode tap 110. Here, although not illustrated in detail in the drawing, rupture lines 124 are provided, while having the triangular grooves facing each other in a width direction of the rupture groove 122, on upper and lower surfaces of the rupture portion connecting area 120, respectively. Here, in three-dimensional explanation, the height (h) may be described as a depth of a groove that is provided in the rupture portion connecting area 120 and in the direction perpendicular to the surface of the electrode tap 110.

That is, as described above, in the rupture portion connecting area 120, the rupture groove 122 is provided at both ends of the rupture line 124 having the shape of the extending triangular groove on the surface of the electrode tap 110, and as described above, the rupture grooves 122 are also provided in the shape of the triangular (V) groove having the first oblique side (a) and the second oblique side (b) which define the predetermined first internal angle (A), while facing each other at the upper and lower ends of the rupture line 124.

Figure 6:
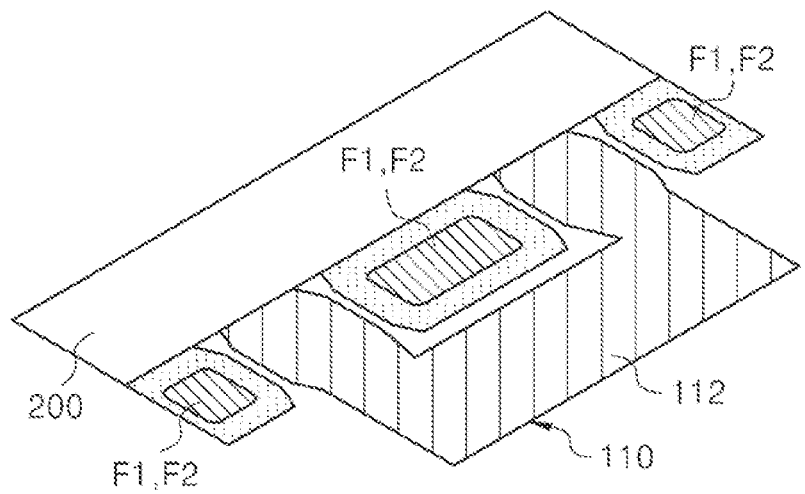
FIG. 6 is a plan view illustrating a ruptured state resulted from the rupture structure according to an embodiment of the present invention.

Therefore, when the stress caused by the swelling phenomenon occurs, the stress is concentrated on the rupture line 124 having the shape of the extending triangular groove through the rupture groove 122 having the shape of triangular (V) shape, and thus the bending force in a direction perpendicular to the surface of the electrode tap 110 is strongly generated in the rupture line 124, which enables accurate and smooth rupture along the rupture lines 124 provided at the upper and lower surfaces of the rupture portion connecting area 120 as illustrated in FIG. 6.

That is, each of the rupture groove 122 and the rupture line 124 has the shape of the triangular (V) groove such that a double structure of the triangular (V) grooves is made, and through this, the stress may be concentrated on the triangular groove and strongly applied.

As described above, the rupture line 124 is ruptured, and the areas F1 and F2 electrically coupled by the welding are separated from the electrode connection part 112 electrically coupled to the electrode assembly 100, which make the shape in which each of the four rupture portion connecting areas 120 denoted as 120 in FIG. 5 is ruptured, and each of the three first weld areas F1 and second weld areas F2 is separated from the electrode connection part 112. That is, the areas F1 and F2 in which the electrode tap 110 is electrically coupled to the electrode lead are separated from the area (the electrode connection part 112) in which the electrode tap 110 is electrically connected to the electrode assembly 100, which may describe that the current flow path between the electrode lead 200 and the electrode assembly 100 is interrupted.

Here, when the size of the predetermined first internal angle (A) constituted by the first oblique side (a) and the second oblique side (b) is too large, its shape may be in a shape close to a flat shape rather than the triangular (V) shape, and thus the stress concentration effect by the triangular (V) shape, i.e., the effect of concentrating the stress on the rupture line 124 may be reduced, and accordingly, it is preferable that the predetermined first angle (A) has the size of less than 150 degrees.

Also, similarly when the size of the predetermined second internal angle (B) constituted by the third oblique side (c) and the fourth oblique side (d) is too large, the effect of concentrating the stress on the groove having the triangular (V) shape may be reduced. Therefore, because a portion constituting the predetermined second internal angle (B) is the portion to be ruptured itself, it may be provided at an angle less than that of the predetermined first angle (A) and, particularly, at an angle less than 90 degrees, so as to enable the more accurate and smooth rupture of the rupture line 124.

According to the structures of the rupture groove 122 and the rupture line 124 in accordance with the present invention, when the stress occurs, the stress is concentrated on the surface of the electrode tap 110 in the longitudinal direction by the rupture groove 122 having the triangular (V) shape and on the rupture line 124 that has the triangular (V) groove extending in the upper and lower surfaces of the rupture portion connecting area 120, and accordingly, the areas F1 and F2 in which the electrode tap 110 is weld to and electrically coupled/connected to the electrode lead 200 are separated from the electrode connection part 112 that is the area electrically connected to the electrode assembly 100. That is, this means that the electrode assembly 100 is electrically disconnected from the electrode lead 200, and thus the current may be interrupted.

Therefore, on the swelling phenomenon, the stress is generated concentrically on the rupture line 124 by the rupture groove 122 having the triangular (V) shape, and the stress is applied intensively to the triangular groove provided in the rupture line, and thus the rupture line 124 may be ruptured more accurately and smoothly.

As described above, the technical idea of the present invention has been specifically described with respect to the above embodiments, but it should be noted that the foregoing embodiments are provided only for illustration while not limiting the present invention. Also, it will be understood by those skilled in the art that various embodiments can be made within the scope of the technical idea of the present invention.

What is claimed is:

1. A pouch type secondary battery comprising:
an electrode assembly in which one or more positive electrode plates and negative electrode plates are stacked;
an electrode tap that extends from the electrode assembly;
an electrode lead bondingly connected to the electrode tap; and
a pouch exterior that surrounds and seals the electrode assembly such that a portion of the electrode lead is exposed,
wherein the electrode lead is provided with a first weld area electrically coupled to the electrode tap,
wherein the electrode tap comprises:
a second weld area electrically coupled to the first weld area;
an electrode connection part distinguished from the second weld area by a rupture portion connecting area, and electrically connected to the electrode assembly; and
the rupture portion connecting area which connects the second weld area and the electrode connection part, and which is ruptured when stress occurs and separates the second weld area from the electrode connection part, and
wherein the electrode lead comprises the first weld area and the second weld area when the rupture portion connection area is ruptured based on the stress.

2. The pouch type secondary battery of claim 1, wherein the rupture portion connecting area comprises rupture lines each of which has a linear shaped groove that is provided on a surface of the electrode tap in a longitudinal direction and is bent and ruptured in a direction perpendicular to the surface when stress occurs.

3. The pouch type secondary battery of claim 2, wherein a rupture groove is provided at each of both ends of each rupture line in a direction parallel to the surface of the electrode tap.

4. The pouch type secondary battery of claim 3, wherein the rupture groove is in a shape of a triangular groove having a first oblique side and a second oblique side which define a predetermined first internal angle.

5. The pouch type secondary battery of claim 4, wherein the rupture line extends in a shape of a triangular groove having a third oblique side and a fourth oblique side which define a predetermined second internal angle and having a height that is a length in a direction perpendicular to the surface of the electrode tap.

6. The pouch type secondary battery of claim 5, wherein the rupture lines are provided, while facing each other in a width direction of the rupture groove, on upper and lower surfaces of the rupture portion connecting area.

7. The pouch type secondary battery of claim 5, wherein the predetermined second internal angle is set to be smaller than the predetermined first internal angle.

8. The pouch type secondary battery of claim 1, wherein the first weld area and the second weld area are connected by a weld when the electrode lead comprises the first weld area and the second weld area.

9. The pouch type secondary battery of claim 1, wherein the second weld area is located at an outer periphery of the electrode tap.

10. The pouch type secondary battery of claim 4, wherein the predetermined first internal angle is less than about 150 degrees.

11. The pouch type secondary battery of claim 5, wherein the predetermined second internal angle is less than about 90 degrees.

12. The pouch type secondary battery of claim 1, wherein the electrode tap comprises three second weld areas spaced apart from each other, and four rupture portion connecting areas connecting the three second weld areas to the electrode connection part, respectively.

* * * * *